(12) United States Patent  
Söder et al.

(10) Patent No.: US 8,343,612 B2
(45) Date of Patent: Jan. 1, 2013

(54) ABSORBENT FIBER WEB

(75) Inventors: Jens Söder, Göttingen (DE); Andreas Schmidt, Duderstadt (DE)

(73) Assignee: McAirlaid's Vliesstoffe GmbH & Co. KG, Steinfurt (DE)

( * ) Notice: Subject to any disclaimer, the term of this patent is extended or adjusted under 35 U.S.C. 154(b) by 477 days.

(21) Appl. No.: 12/470,897

(22) Filed: May 22, 2009

(65) Prior Publication Data

US 2009/0324893 A1 Dec. 31, 2009

(30) Foreign Application Priority Data

May 23, 2008 (DE) .................... 20 2008 007 008 U

(51) Int. Cl.
*B32B 3/00* (2006.01)
*B32B 27/14* (2006.01)
*B32B 5/26* (2006.01)
*B32B 21/02* (2006.01)
*B32B 21/10* (2006.01)

(52) U.S. Cl. ........ 428/172; 428/198; 442/340; 442/346; 442/350; 442/385

(58) Field of Classification Search ............... 428/156, 428/172, 171, 170, 198, 165, 161, 162; 442/333, 442/334, 409, 413, 381, 414, 394, 382–393, 442/395, 396, 397, 398, 399, 340, 341, 342, 442/343, 346, 350, 351

See application file for complete search history.

(56) References Cited

U.S. PATENT DOCUMENTS

| 4,043,331 | A | 8/1977 | Martin et al. |
| 5,652,041 | A * | 7/1997 | Buerger et al. ............... 428/198 |
| 6,653,524 | B2 * | 11/2003 | DeLucia et al. ............... 604/367 |
| 6,753,454 | B1 | 6/2004 | Smith et al. |
| 6,913,718 | B2 * | 7/2005 | Ducker et al. ............... 264/37.1 |
| 2002/0019187 | A1 * | 2/2002 | Carroll et al. ............... 442/394 |
| 2006/0128247 | A1 * | 6/2006 | Skoog et al. ............... 442/384 |
| 2006/0214323 | A1 * | 9/2006 | Chappas et al. ............... 264/138 |

FOREIGN PATENT DOCUMENTS

| EP | 1 032 342 B1 | 7/2001 |
| WO | 01/27365 A1 | 4/2001 |

* cited by examiner

*Primary Examiner* — Catherine A Simone
(74) *Attorney, Agent, or Firm* — Gudrun E. Huckett

(57) ABSTRACT

An absorbent fiber web has a base layer of cellulose fibers and an external layer that is connected at least across areas thereof with the base layer. The external layer is a nonwoven of nano fibers. The base layer and the nonwoven are connected to one another across areas thereof without a binder.

14 Claims, 1 Drawing Sheet

ABSORBENT FIBER WEB

BACKGROUND OF THE INVENTION

The present invention concerns an absorbent fiber web with at least one base layer comprised of cellulose fibers and at least one external layer that is at least over areas thereof connected to the base layer.

In the field of hygiene, fiber webs made from cellulose fibers are widely used. The fiber webs serve as an absorbent core for absorbing bodily fluids. They have the task of absorbing quickly and absorbing permanently the bodily fluids. A further property of a cellulose web is allowing passage of liquids or gases into structures underneath. Since the fiber webs often have direct contact with the body, they should be as compatible as possible with the body and should absorb the incoming liquid in a well distributed fashion. Cellulose has furthermore the advantage that it is biologically decomposable, i.e., it can be disposed of in appropriate landfills where it decomposes without any residue. For their use in hygiene articles, the fiber webs should be highly absorbent or well conducting, should be soft and processable as a web. For increasing the absorption capacity, the fiber matrix has added to it so-called superabsorbers, i.e., polymers that under formation of hydrogels can take up water. The use of the fiber webs in the field of hygiene makes it necessary that the materials for the production of the hygiene articles contain additives and other auxiliary agents only to a limited extent. For processing the fiber webs to absorbent cores, they are usually employed in the form of cellulose nonwovens and airlaid materials. Bonding of the individual cellulose fibers is achieved by binding agents.

Aside from the use in the field of hygiene, the fiber webs can also be used in other areas such as cosmetics or in household applications, for example, for removing dirt or other substances from surfaces as well as for cleansing the skin and for body care. For removing substances from surfaces and also for cleaning purposes, the pure fiber webs are disadvantageous because they have a relatively minimal strength. Moreover, cellulose is a hydrophilic substance that in contact with water absorbs other hydrophilic substances while the absorption and removal of hydrophobic substances is possible only as a result of mechanical rubbing.

The manufacture of binder-free fiber webs is also known. For example, in European patent 1 032 324 B1 a method for producing absorbent and rollable fiber webs comprised of cellulose fibers or cellulose pulp or cellulose cardboard without use of additional binders is disclosed which fiber webs have a tear strength of at least 0.12 kN/m. In the disclosed method a random cellulose fiber layer is provided and pre-compressed at relatively low pressure so that a loose nonwoven with minimal density and tear strength is produced. This nonwoven is then introduced into the nip of a calander roller pair so that a pattern of dot-shaped or line-shaped pressure areas is produced at relatively high pressure and the randomly positioned fibers are pressed against one another. The fibers are pressed against one another in the calander roller pair at a pressure of 250 to 600 MPa so that a non-detachable fusion of the fibers is realized and on the fiber web an embossment pattern is generated. For producing the fiber webs that are known in the prior art, usually commercially available cellulose fibers are used that, for example, are known by the technical term fluff pulp. In this form of use the cellulose fibers are present in stretched form.

The goal is therefore to produce a fiber web on the basis of cellulose fibers which fiber web is suitable for novel applications because of its specific absorption capability for water.

SUMMARY OF THE INVENTION

Object of the present invention is therefore an absorbent fiber web of the aforementioned kind that is characterized in the at least one external layer is a nonwoven comprised of nano fibers and that the base layer and the nonwoven are connected to one another across areas thereof in a binder-free way.

Surprisingly it was found that by combining a base layer of cellulose fibers and an external layer that is in the form of a nonwoven comprised of nano fibers the properties of a fiber web are changed and that it is therefore suitable for more varied applications than fiber webs with cellulose at the top side. While by means of the cellulose fibers hydrophilic substances are substantially absorbed, it was found that with the combination of cellulose fibers and nano nonwoven hydrophobic substances are absorbed also. This property exhibits great advantages particularly in cosmetics and in skin care; grease-containing contaminants or also skin care products such as makeup can be removed without problems from the skin without further additives or auxiliaries, such as surface active agents or other cleaning agents, in particular when the fiber web according to the invention is exposed to water.

Moreover, it was found that the nano nonwovens when used in the cosmetics field shows a slightly abrasive effect and, for example, when removing decorative cosmetics the fiber material according to the invention exerts a peeling effect on the skin.

The term nano nonwoven in the context of the present invention is to be understood as nonwovens of textile fibers with a diameter of usually less than 30 µm. Preferably employed fibers have a diameter between 50 nm and 25 µm, in particular between 50 nm and 5 µm. Nano nonwovens and methods for their production are disclosed, for example, in U.S. Pat. No. 4,043,331 and international patent application WO01/27365. They are commercially available and can contain, in addition to the aforementioned polymers, optionally also additives, thin coatings etc. The fibers can be placed in the nonwoven in a defined way in one or several preferred directions or can be oriented stochastically. They can be loosely laid or can be compacted. Preferably, they are produced from a melt-spinnable polymer material, in particular, polyurethane, polypropylene, polyethylene, polytetrafluoroethylene, silicone polymers or biologically decomposable polymers such as PLA or starch-based products.

The nano nonwoven has in the fiber web according to the invention usually a thickness between 5 and 1,000 µm, in particular between 10 and 500 µm and an average pore size of 1 to 100 µm.

In one possible embodiment, in the fiber web according to the invention the external layer of nano fibers and the base layer are connected to one another across areas thereof in discrete areas without a binder as a result of pressure loading and optionally heat application limited to these areas. The heat application is in particular advantageous in case of nano nonwovens that contain additionally low-melting polymers. These low-melting polymers may begin to melt surficially when producing the fiber web according to the invention by pressure loading and optionally heat application and thus produce a connection between nano nonwoven and base layer. The heat application is preferably from 60 to 130° C., preferably the temperature is above 80° C.

In a further embodiment, the fiber web according to the invention has discrete embossment areas with depressions on both faces at locations where the base layer and the external layer(s) is/are connected to one another, wherein in these embossment areas the cellulose fibers of the base layer as well as the nano fibers of the nonwovens are connected to one another, respectively.

The base layer employed in the fiber web has a high proportion of cellulose fibers connected to one another that are compressed with one another in an embossment pattern of dot-shaped or line-shaped embossment areas and, in the embossment areas, are connected to one another without adhesive and/or binder as a result of high-pressure loading.

The base layer is comprised preferably of a fill that is layered in an air stream (airlaid) and comprised of cellulose fibers of defiberized cellulose (wood pulp) that is referred to as "fluff pulp". Moreover, sulfide-bleached or sulfate-bleached long fiber cellulose can be employed.

For improving the absorption capability and/or the cleaning behavior relative to the substances to be absorbed or removed, the base layer as well as the external layer may have additives of auxiliary agents and fillers, such as titanium dioxide, chalk, kaolin, superabsorbent polymers, odor-inhibiting agents such as those on the basis of cyclodextrin.

In a further embodiment, the absorbent fiber web according to the invention can have on both faces of the base layer a nonwoven layer of nano fibers, respectively, that are connected across areas thereof with the base layer. In an alternative embodiment, the base layer has on one face a nonwoven layer of nano fibers and on the other face a layer of any web-like material such as textiles (woven textiles as well as nonwovens), water-impermeable and water-permeable plastic film or breathable plastic films.

In one possible embodiment on the topside of the base layer, one layer of a water-impermeable or water-permeable plastic film, respectively, is arranged and connected across areas thereof with the base layer; in an alterative embodiment the additional layer is a plastic film that is completely connected to the base layer, for example, by gluing, without e.g. forming embossed areas.

BRIEF DESCRIPTION OF THE DRAWINGS

Embodiments of the invention will be explained in the following with the aid of drawings. It is shown in.

DESCRIPTION OF REFERRED EMBODIMENTS

Figure 1:
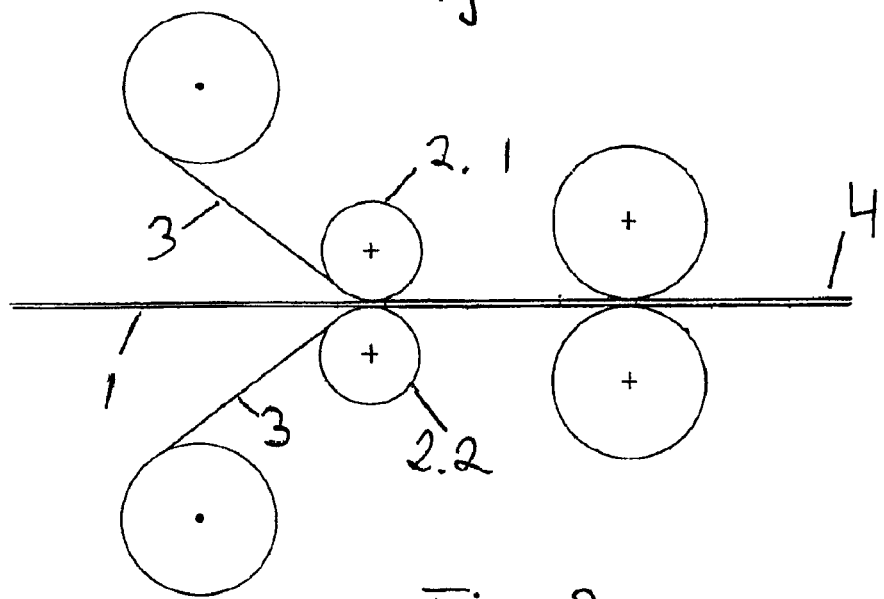
FIG. 1 in a schematic illustration a device for producing the fiber web according to the invention, FIG. 2 in an enlarged illustration according to FIG. 1 a cross-section of the pressure area of two rollers with pyramid-shaped projections.

In FIG. 1 in a schematic sequence an arrangement of cylinders and rollers is illustrated with which the absorbent fiber web according to the invention can be produced. The manufacturing process begins with cellulose fibers that, as fluff pulp, preferably of dry wood pulp are individualized by means of hammer mills. A layer of randomly laid fibers is placed onto a screen conveyor belt, not illustrated here, onto the nano nonwoven and is conveyed to a first calander cylinder pair. Between the calander rollers a randomly laid cellulose fiber layer is compressed to a loose nonwoven with minimal density and tear strength. The compressed and compacted nonwoven of randomly laid fibers represents the base layer 1 of the fiber web according to the invention. This compacted base layer 1 is conveyed to a calander cylinder pair 2.1 and 2.2. Before entering the calander rollers 2.1 and 2.2, a nano nonwoven or film 3 is placed from above. In another embodiment the lower nano nonwoven 3 is supplied at this point (see FIG. 1) and not beforehand as mentioned above.

Between the calander rollers 2.1 and 2.2 the cellulose fiber layer (base layer) 1 with nonwoven 3 placed thereon is exposed to a grid of projections 5 (see FIG. 2) producing dot-shaped pressure areas in which the randomly laid fibers are compressed with one another at high pressure so that an intimate fusion of the fiber bodies is realized that does not release after the pressure is removed and a fiber web 4 with an embossment pattern is produced, whereby the film is also integrated into the composite. The pressure loading action avoids that the fiber material or film material will char or carbonize. Additional binding is achieved by the film material that sinters or surficially melts. The rollers 2.1 and 2.2 are operated at regular room temperature, i.e., between 18 and 26° C., wherein, however, it is not excluded that the rollers may be heated or that in the dot-shaped pressure areas also locally a higher temperature resulting from the mechanical work may be reached.

Figure 2:
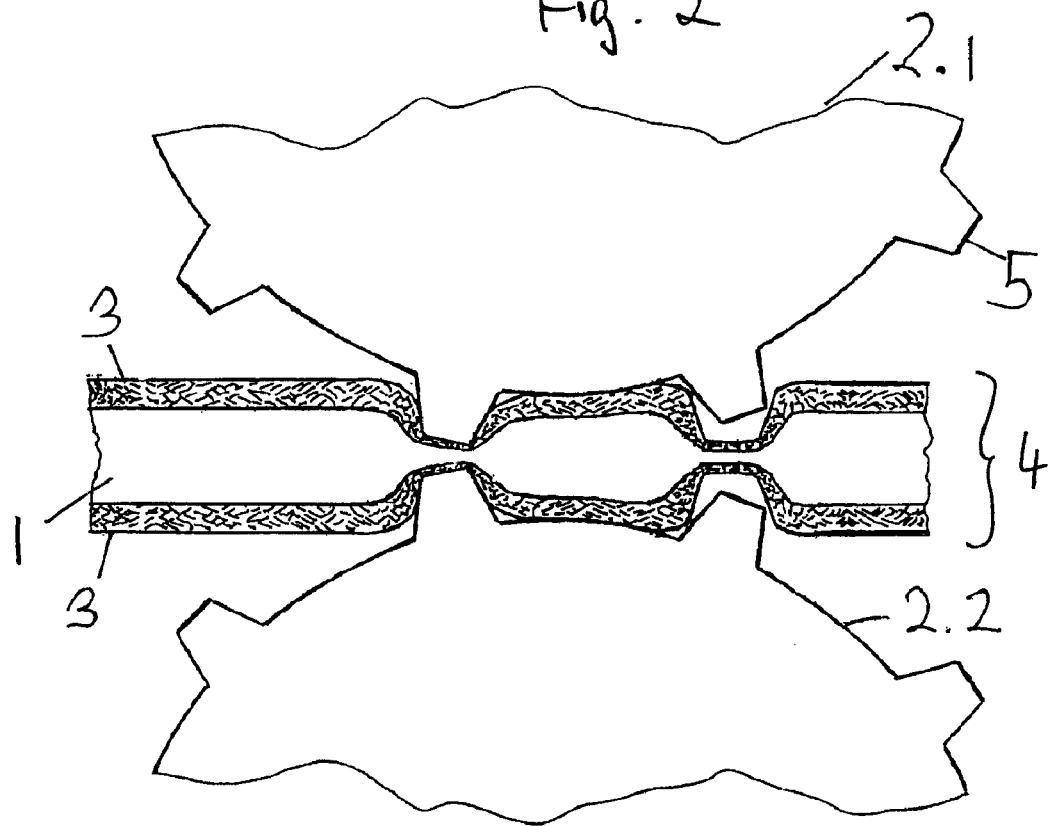

In FIG. 2 one embodiment of a high-pressure area between the calander rollers 2.1 and 2.2 is produced. The cylinders are provided on their cylinder surface with projections 5 that produce in the finished fiber web the embossment pattern. Other shapes of pressure areas, such as truncated cone shapes, cylinders or parallelepipedal shapes are possible also and are selected by discretion of a person skilled in the art in accordance with the required pressure, the provided starting material, and the material of the cylinders, the occurring temperatures and the like.

What is claimed is:

1. An absorbent fiber web comprising:
    a base layer comprised of a fiber web of a fill of cellulose fibers of defiberized cellulose which cellulose fibers are layered in an air stream;
    an external layer that is connected at least across areas thereof with the base layer, wherein the external layer is a nonwoven comprised of nano fibers; and
    wherein the base layer and the nonwoven are only connected to one another across discrete areas thereof, wherein the base layer and the non woven are connected without a binder in the discrete areas by pressure loading and optionally heat application locally applied in the discrete areas.

2. The fiber web according to claim 1, wherein on the top side of the base layer a layer of a water-impermeable or a water-permeable plastic film is arranged, respectively, and is connected to the base layer in the discrete areas.

3. The fiber web according to claim 1, wherein a temperature range of the heat application is from 60° C. to 130° C.

4. The fiber web according to claim 1, wherein the discrete areas are embossment areas with paired opposed depressions on both faces of the fiber web and wherein, between the paired opposed depressions, the cellulose fibers of the base layer and the nano fibers of the nonwoven are compressed with one another, respectively, to produce an intimate fusion between base layer and the nonwoven.

5. The fiber web according to claim 1, wherein the nanofibers have a diameter of 50 nm to 25 μm.

6. The fiber web according to claim 1, wherein the nano fibers are comprised of melt-spinnable polymer material.

7. The fiber web according to claim 6, wherein the melt-spinnable polymer material is selected from the group consisting of polyurethane, polypropylene, polyethylene, polytetrafluoroethylene, and silicone polymer.

8. The fiber web according to claim 1, wherein the external layer has a thickness between 25 and 1,500 μm and an average pore size of 1 to 100 μm.

9. The fiber web according to claim 8, wherein the thickness is between 50 and 1,000 μm.

10. The fiber web according to claim 1, wherein the base layer has a high proportion of cellulose fibers that are compressed with one another in an embossment pattern of dot-shaped or line-shaped embossment areas are connected without an adhesive and/or without a binder in the embossment areas as a result of high pressure loading.

11. The fiber web according to claim 1, wherein at least one of the base layer and the external layer comprises an additive selected from auxiliary agents and fillers.

12. The fiber web according to claim 11, wherein the additive is selected from the group consisting of titanium dioxide, chalk, kaolin, superabsorbent polymers, odor-inhibiting agents.

13. The fiber web according to claim 12, wherein the odor-inhibiting agent comprises cyclodextrin.

14. The fiber web according to claim 1, wherein on a face of the base layer opposite the external layer an additional layer of a nonwoven of nano fibers is arranged and is connected across areas thereof with the base layer.

* * * * *